United States Patent
Kumar et al.

(10) Patent No.: US 11,755,317 B2
(45) Date of Patent: Sep. 12, 2023

(54) EXTENSIBLE PLATFORM AS A SERVICE PLATFORM FOR USE BY MULTIPLE ENTERPRISES

(71) Applicant: salesforce.com, inc., San Francisco, CA (US)

(72) Inventors: Mayank Kumar, Fremont, CA (US); Benjamin Caldwell, San Francisco, CA (US); Karthik Sudana, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 88 days.

(21) Appl. No.: 17/555,152

(22) Filed: Dec. 17, 2021

(65) Prior Publication Data

US 2023/0119962 A1    Apr. 20, 2023

Related U.S. Application Data

(60) Provisional application No. 63/256,046, filed on Oct. 15, 2021.

(51) Int. Cl.
*G06F 8/71* (2018.01)
*G06F 9/54* (2006.01)
(Continued)

(52) U.S. Cl.
CPC ............ *G06F 8/71* (2013.01); *G06F 8/65* (2013.01); *G06F 9/54* (2013.01); *G06F 11/3684* (2013.01);

(Continued)

(58) Field of Classification Search
None
See application file for complete search history.

(56) References Cited

U.S. PATENT DOCUMENTS

| | | | | |
|---|---|---|---|---|
| 6,915,507 | B1 * | 7/2005 | Kaier | G06F 16/93 717/103 |
| 8,645,977 | B2 * | 2/2014 | Jacobson | G06F 9/45537 719/328 |

(Continued)

OTHER PUBLICATIONS

Wang, "Towards PaaS Using Service-Oriented Component Model", 2010, ACM (Year: 2010).*

(Continued)

*Primary Examiner* — Hossain M Morshed
(74) *Attorney, Agent, or Firm* — Fenwick & West LLP

(57) ABSTRACT

An extensible platform-as-a-service (PaaS) system for use during the software development lifecycle (SDLC) processes of a user application. The extensible PaaS system receives, from a user, values associated with a user application for features exposed in a presented application programming interface (API) to the user. The system displays a set of software modules for during the SDLC processes of the user application. The system receives a selection of software modules for custom configuration from the user. The system generates a set of custom configured software modules for the received selection of software modules. The system generates a set of automatically configured software modules for the remaining software modules. The system uses the custom configured software modules and the automatically configured software modules during the SDLC processes of the user application.

20 Claims, 5 Drawing Sheets

(51) Int. Cl.
*G06F 21/57* (2013.01)
*G06F 21/62* (2013.01)
*G06F 8/65* (2018.01)
*G06F 11/36* (2006.01)

(52) U.S. Cl.
CPC ...... *G06F 11/3688* (2013.01); *G06F 11/3692* (2013.01); *G06F 21/577* (2013.01); *G06F 21/6218* (2013.01); *G06F 2221/033* (2013.01)

(56) References Cited

U.S. PATENT DOCUMENTS

| | | | | |
|---|---|---|---|---|
| 11,593,500 | B1* | 2/2023 | Coenders | G06Q 10/06315 |
| 2002/0108099 | A1* | 8/2002 | Paclat | G06F 8/24 |
| | | | | 717/102 |
| 2010/0313182 | A1* | 12/2010 | Chen | G06F 8/38 |
| | | | | 717/109 |
| 2012/0102451 | A1* | 4/2012 | Kulkarni | G06F 8/24 |
| | | | | 717/102 |
| 2012/0159423 | A1* | 6/2012 | Becker | G06F 9/44526 |
| | | | | 717/102 |
| 2016/0127454 | A1* | 5/2016 | Maheshwari | H04L 41/20 |
| | | | | 709/223 |
| 2016/0337474 | A1* | 11/2016 | Rao | H04L 41/12 |
| 2016/0344590 | A1* | 11/2016 | Huey | H04Q 11/0071 |
| 2018/0373520 | A1* | 12/2018 | Lim | H04L 41/082 |
| 2021/0240818 | A1* | 8/2021 | Seksenov | G06F 16/986 |
| 2022/0109718 | A1* | 4/2022 | Henley | H04L 67/02 |
| 2023/0058197 | A1* | 2/2023 | Comer | G06F 9/44505 |
| 2023/0119962 | A1* | 4/2023 | Kumar | G06F 11/3692 |
| | | | | 717/102 |

OTHER PUBLICATIONS

Wettinger, "Enabling Dynamic Deployment of Cloud Applications Using a Modular and Extensible PaaS Environment", 2013, IEEE (Year: 2013).*

* cited by examiner

EXTENSIBLE PLATFORM AS A SERVICE PLATFORM FOR USE BY MULTIPLE ENTERPRISES

CROSS REFERENCE TO RELATED APPLICATIONS

This application claims the benefit of U.S. Provisional Application No. 63/256,046, filed Oct. 15, 2021, which is hereby incorporated in its entirety by reference.

FIELD OF ART

This disclosure relates in general to automating software development lifecycle processes, and in particular, to development of an extensible Platform as a Service (PaaS) model.

DESCRIPTION OF THE RELATED ART

Software application developers within enterprises build systems targeting specific application-specific logic. However, the enterprises have complex software development life cycle (SDLC) processes and trust processes. Furthermore, the underlying infrastructure used by enterprises is constantly evolving. As a result, developers within these enterprises have to address a multitude of issues that arise from the complexities in the SDLC and security processes as well as the evolving infrastructure issues in the course of developing the specific application-specific logic and shipping the resulting code to production. Platform as a service (PaaS) systems are developed based on a cloud computing model to mitigate some of the problems that developers face. Conventional PaaS systems are built on mature infrastructure with well-defined application programming interfaces (APIs) that are assumed to not change. Conventional PaaS systems are typically built on infrastructure that is not evolving. For example, a PaaS system may be built on mature infrastructure that has well defined APIs. Accordingly, these PaaS systems are not expected to change. However, as infrastructure continues to evolve during the course of development of application-specific logic targeted software code, these conventional systems are unable to adapt.

Accordingly, conventional PaaS systems may offer limited use during SDLC processes that application developers address under constantly evolving infrastructure demands. There is a need for PaaS systems that may be used by application developers during various SDLC processes while being able to offer resolutions to constantly evolving infrastructure demands.

Figure 1:
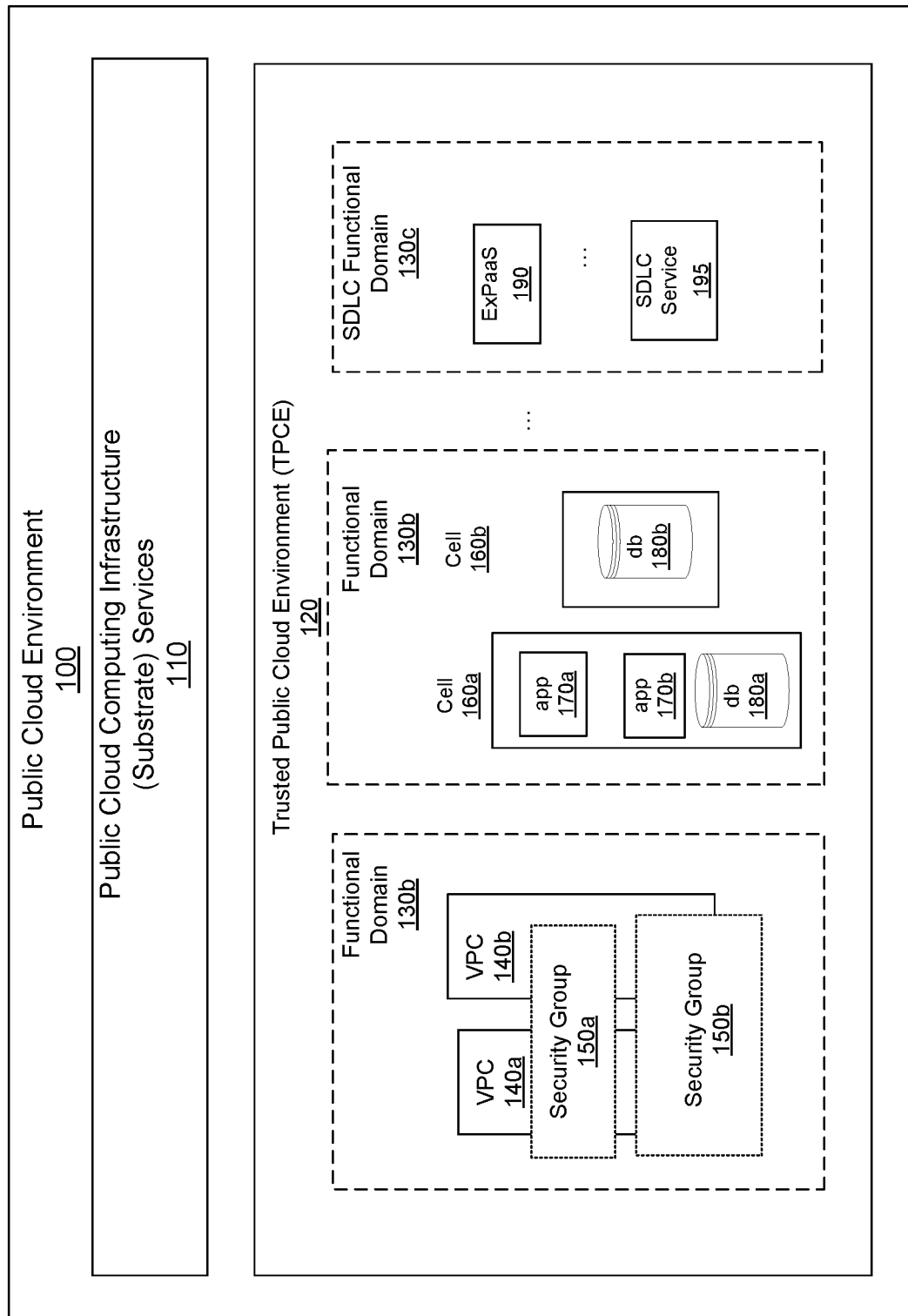
FIG. 1 depicts a block diagram illustrating functional blocks for a trusted public cloud environment that leverages a widely available public cloud environment, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral.

DETAILED DESCRIPTION

Large enterprises have several software application developers who are building software modules that are targeting specific application-specific logic. The software modules have complex SDLC processes including various phases such as planning, analysis, design, development, testing, implementation, deployment, maintenance, as well as day to day operations such as releasing new versions of applications to production. Application developers may also be continuously releasing new versions of their applications to production. Furthermore, within each of these phases, there may be built-in security and trust processes. Conventional PaaS systems are based on a cloud computing model where hardware and software tools needed for application development may be provided to the application developers, leaving them free to focus on the application-specific logic development without addressing other SDLC process needs. However, since underlying infrastructure modules may constantly evolving developers may still need to address a multitude of issues during SDLC processes in the course of developing the specific application-specific logic and shipping the resulting code to production. Embodiments described herein describe an extensible PaaS system for use by application developers during various SDLC processes while addressing constantly evolving infrastructure demands.

Embodiments described herein automate the SDLC processes for developer applications using an abstraction model and an extensible PaaS model. Embodiments expose an application program interface (API) to an application developer based on the abstraction model. The application developer may interact with the following features (also termed virtual software resources) in the exposed API: application, artifacts (of the application), environments (in which the application may exist), and the pipeline (defining the flow of the artifacts in the environments). Thus, the abstraction model represents a set of underlying software modules of the extensible PaaS system that may be automatically configured for use during the SDLC processes of the developer/user application with the exception of the few features that are exposed by the API. The features exposed by the API represent minimal configuration required by those abstractions and the rest of the configurations are defaulted or assume some safe defaults. The underlying software modules which are automatically configured are referred to as modules and they may not necessarily map one to one with the APIs. The underlying software modules of the extensible PaaS system may also be termed modules of the extensible PaaS system. The virtual software resources that are exposed by the API are presented to the application developer to configure, and they represent a minimal set of configurations that are required from the developer by the abstraction model; the rest of the configurations are assumed to be configured with safe default values. Additionally, in contrast to conventional PaaS systems, extensibility of the PaaS system is provided to the developer during the SDLC processes of the user application. Embodiments enable developers to select one or more of the underlying software modules (or components) in the extensible PaaS system and either partially custom-configure the selected modules for their specific purposes or replace the selected software modules with developer-customized modules for use in the SDLC processes of the applications. The developer-customized modules may also be incorporated into the abstraction model upon meeting specified security requirements.

An advantage provided by embodiments of the extensible PaaS system described herein is that by providing a means for software application developers to extend the PaaS model by customizing selected modules—either partially or replacing them entirely, the extensible PaaS system allows the application developer to bring their insight in customizing modules. Conventional PaaS systems automatically configure software modules for use by developers. Given that some underlying software modules in a conventional PaaS system may be vendor-locked, it may not be possible to even view all the configurable features in a software module. Conventional PaaS systems do not facilitate customization of the underlying software modules. The extensible PaaS system enables retention of a large portion of the automation needed for efficiently addressing SDLC processes during application development while enabling the developer to still customize a few of the underlying software modules as the underlying infrastructure evolves and as the needs of the application developer evolves. For example, the application developer may have previously wanted continuous deployment (CD) with some default configuration values, but now seeks to custom configure an aspect of the CD system that is not exposed by the API. The extensible PaaS system provides the ability for the application developer to choose and perform such custom configuration of certain underlying modules of the extensible PaaS system.

Overall System Environment

FIG. 1 shows a block diagram illustrating a trusted public cloud environment (TPCE) 120 that leverages an available public cloud environment (PCE) 100, in accordance with one embodiment. Public cloud environments 100 are owned and operated by third-party providers, and the hardware, software, and supporting infrastructure is also owned and managed by the third-party cloud provider. Examples of public cloud environment 100 include, for example, Amazon Web Services™ (AWS™), Google Cloud Platform™ (GCP™), Azure™, etc.

A public cloud environment 100 offers a range of public cloud computing infrastructure services 110 that may be used on demand by a trusted public cloud environment 120. Examples of the public cloud computing infrastructure services include servers, storage, databases, networking, security, load balancing, software, analytics, intelligence, and other infrastructure service functionalities. These infrastructure services may be used by the trusted public cloud environment 120 to build, deploy, and manage applications in a scalable and secure manner. The trusted public cloud environment 120 is a trusted public cloud architecture with processing resources, networking resources, storage resources, and other service functionalities with security boundaries that are strictly enforced. An example of a trusted public cloud environment 120 is a datacenter with defined and strictly enforced security boundaries.

The trusted public cloud environment 120 has specific attributes, in accordance with some embodiments. These attributes include attributes required to use available public cloud infrastructure services 110, for example region-specific attributes or environment type specific attributes. Further attributes support security needs, availability expectations, architectural agility coupled with reliability, developer agility, distributed capabilities, and the ability to perform on multiple available public cloud environments.

The trusted public cloud environment 120 may comprise of various instances TPCEI (trusted public cloud environment instances) 125a, 125b, . . . etc. For example, the various instances may be regional instances such as US-west and US-east, in each of which service owners may run multiple copies of applications to provide for redundancy requirements.

The trusted public cloud environment 120 (or each instance TPCEI 125) may support multiple functional domains 130a, 130b, . . . , 130n. Each functional domain (FD) 130 represents a set of capabilities and features and services offered by one or more computing systems that can be built and delivered independently, in accordance with one embodiment. A functional domain 130 may also be viewed a set of cohesive technical/application-specific use-case functionalities offered by one or more computing systems. A functional domain 130 has strictly enforced security boundaries. A functional domain 130 defines a scope for modifications. Thus, any modifications to an entity—such as a capability, feature, or service—offered by one or more computing systems within a functional domain 130 may propagate as needed or suitable to entities within the functional domain but will not propagate to an entity residing outside the bounded definition of the functional domain 130.

Each functional domain 130 may contain multiple virtual private cloud (VPC) networks, 140a, 140b, . . . , etc. Each virtual private cloud 140 is an on-demand pool of shared resources that are allocated within the functional domain 130 and provide a level of isolation between the users using the resources. VPCs within a functional domain residing within a single public cloud environment may establish connectivity with each other using native multi-VPC network connectivity capabilities available to them via underlying networking infrastructure. For example, native options for multi-VPC network connectivity capabilities include inter-region VPC peering for Amazon Web Service™, inter-region VNet peering for Azure™, and Global VPCs for Google Platform Services™. Connectivity may be provided to two VPCs residing within different PCEs through VPNs. Each functional domain 130 may also contain multiple security groups, 150a, 150b, . . . , etc. Each security group 150 represents a declarative model for enforcing network segmentation. Each security group 150 includes entities with similar risk service profiles collected into a single security group with explicit declarative policy brokering connectivity between the groups.

A functional domain 130 may also contain one or more cells, 160, 160b, . . . , etc. A cell 160 represents a collection of services that scale together, and that may be sharded. These services may be applications 170a, 170b, . . . , etc., and/or databases 180a, 180b, . . . , etc. The applications 170a, 170b, . . . , may individually be developed using embodiments of an extensible PaaS system 190.

In embodiments described herein, an instance of the trusted public cloud environment instance TPCEI 125 may each have an extensible PaaS system, running within TPCE (trusted public cloud environment) instance. In an embodiment, a copy of the extensible PaaS system is executed that deploys applications which can run in development, test, and production environments. This configuration happens in their continuous delivery pipelines using the API. Some embodiments may run multiple copies of the extensible PaaS system. The extensible PaaS system 190 may run in a specific functional domain (FD), for example an SDLC functional domain (or control FD) 130c. The SDLC functional domain 130c represents a group of services that support SDLC including extensible PaaS system 19p and other SDLC services 195. A system administrator or a service owner may specify a functional domain in which the extensible PaaS system is run.

A use-case workflow example of some embodiments of the extensible PaaS system is described below. This is followed by a description of the architecture of embodiments of the extensible PaaS system. Following the architecture description is a description of a flowchart of some of the processes executed by embodiments of the extensible PaaS system described herein.

Extensible Platform-as-a-Service System— a Workflow Example

Figure 2:
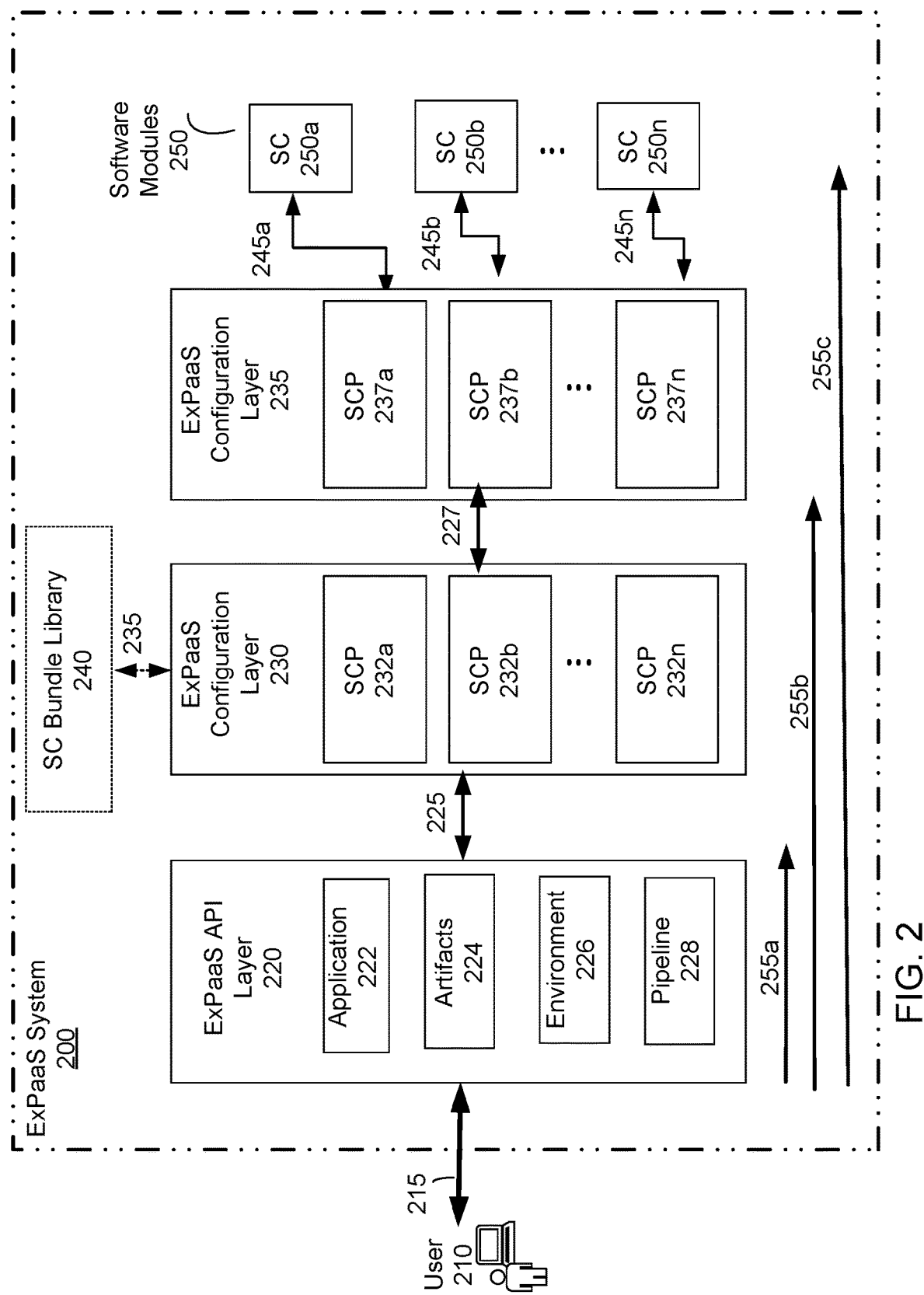
FIG. 2 depicts an exemplary workflow illustrating use of an extensible PaaS system, according to one embodiment.

FIG. 2 depicts a workflow example of using the extensible PaaS system 200, such as exPaaS system 190 as depicted in FIG. 1, in accordance with one embodiment. The example shown in FIG. 2 may be performed in trusted public cloud environments such as trusted public cloud environment 120 that resides within a public cloud environment such as public cloud environment 100 depicted in FIG. 1.

In some embodiments, the exPaaS system 200 includes an exPaaS API layer 220, an exPaaS configuration layer 230, an SC library 240, and a set of underlying software modules 250. A user 210 may be an application developer who interacts 215 with the exPaaS system 200 using an application programming interface (API) that is presented by the exPaas API layer 220.

The exPaaS API layer 220 presents an API to the user 210. Conventional systems have only one PaaS API layer, for example, the layer 220. In contrast extensible PaaS system has multiple layers, for example, layers 230 and 235 in addition to layer 220. The inner layers 230 and 235 of the exPaaS system allow users to expose more complexity of software modules 250 being configured. For example, the user 210 may start with a simple configuration based on exPaaS layer 220 where most of the configurations of the software modules 250 are based on default values and a minimal amount of configuration is exposed by the exPaaS layer 220. A user that wants to expose and modify more details of a particular module, for example, software module 250a may use the inner exPaaS configuration layer 230 for software module 250a but may continue to configure the remaining software modules using the top level exPaaS API layer 220. At a later stage, the user may want to expose and modify more details of another module, for example, software module 250b and may use the inner exPaaS configuration layer 230 for software module 250a as well as 250b but may continue to configure the remaining software modules using the top level exPaaS API layer 220. At some stage, the user may want to expose and modify even more detailed configurations of a software module, for example, 250a. The user may accordingly use the exPaaS configuration layer 235 for configuring software module 250a while using the exPaaS configuration layer 230 for software module 250b and continuing to use the exPaaS layer 220 for remaining modules, e.g., 250c, 250d, . . . 250n.

The presented API encapsulates a simplified abstraction model for automating SDLC processes during application development for the user 210 by exposing only a limited number of features from the set of all possible configurable features of the underlying platform software modules to the user 210. The user 210 may interact 215 with some of the following features in the presented API: application 222, artifacts 224, environments 226, and the pipeline 228. The application 222, artifacts 224, environments 226, and pipeline 228 together expose a set of limited configurable features associated with the user application to the user 210. These are used by the exPaaS system 200 to automatically configure the underlying software modules of the platform for use during the SDLC processes of the user application. In some embodiments, the API presented by the exPaaS API layer 220 may receive 215 values for the exposed features from the user 210. The values from the user may be in the form of source code, data such as name of the application, team name associated with the application developer, environments in which the application may reside (functional domain associated with the application, TCPE instances), code libraries, etc. The API may also receive queries and commands from the user 210 and display the responses to these queries and commands.

The exPaaS configuration layer 230 serves the simplified abstraction model represented by the exPaaS API layer 220 by automatically configuring the underlying software modules for use during the SDLC processes of a user application under development by the user 210. The exPaaS configuration layer 230 may be viewed as including a set of modules SCP 232a, SCP 232b, SCP 232n that act as proxy software modules with automatically configured configurations that are based on further underlying actual (yet to be configured) software modules 250, i.e., SC 250a, SC250b, . . . , SC 250n, respectively. The automatically generated configurations generated at the exPaaS configuration layer 230 may be based on the received 225 data values for features from the user 210 at the exPaaS API layer 220. The exPaaS configuration layer 230 may also obtain 235 predefined, default, and security-approved templates from a software module library SC library 240. The required values for the exposed features of application 222, artifacts 224, environment 226, and pipeline 228 provided by the user 210 at the exPaaS API layer 220 and the templates obtained from the SC library 240 at the exPaaS configuration layer 230 are used by the exPaaS system 200 by individually configuring (245a, 245b, . . . , 245n) the software modules 250 to generate a platform of underlying software modules SCP 232 for use in the SDLC processes of the user application.

In addition to the above-described workflow that demonstrates use of a PaaS system to obtain a set of automatically configured underlying software modules during application development, the exPaaS system 200 further enables the user 210 to customize configurations for selected underlying software modules SC 250. This is described below.

The API presented by the exPaaS API layer 220 may receive queries and commands from the user 210. These queries and commands facilitate viewing, by the user 210, of a set of the underlying software modules 250 that form the platform of software modules for use during SDLC processes for application development. The set of the underlying software modules 250 that form the platform of software modules may be presented as a list of software modules to the user 210. The user 210 may select a subset of software modules (e.g., SC 250a and SC 250n shown in FIG. 2) from the presented list for custom configuration (i.e., the user 210 selects to not use the automatic/default configurations SCP 232*a* and SCP 232*n* for software modules SC 250*a* and SC 250*n* respectively, but instead chooses to actively customize software modules 250*a* and SC 250*n* as desired; however, the user will use the automatically configured SCP 232*b* for software module SC 250*b*).

The exPaaS API layer can be used to customize a subset of modules, for example, a single module, two modules, or more modules. The values of the parameters or attributes that are not customized are automatically determined by the system using best practices and safe default values. Furthermore, depending on the API layer of the exPaaS that is used, the degree of customization of each module may be different (or same). For example, a module SC 250*a* may be customized 255*a* using the exPaaS API layer 220 that allows minimal customization. Another module SC 250*b* or the module SC 250*a* at a later stage during the development may be customized 255*b* to a higher degree using the exPaaS API layer 230. Similarly, another module SC 250*c* or the modules SC 250*a* or 250*b* at a later stage during the development may be customized 255*c* to an even higher degree using the exPaaS API layer 235. The different degrees of customization are illustrated using the arrows 255*a*, 255*b*, and 255*c*.

The exPaaS API layer 220 subsequently may present APIs for receiving custom configuration data from the user 210 for the selected subset of underlying software modules (e.g., for software modules SC 250*a* and SC 250*n*). Thus, the exPaaS system 200 enables the user 210 to use the automatically configured SCP 232*b* along with the custom configured SC 250*a* and SC 250*n* during the SDLC processes of a user application under development. The exPaaS system 200 may enable the user 210 to move between using an automatically configured software module SCP 232 and a custom configured software module 250 at any time during the SDLC processes of a user application under development.

System Architecture

Figure 3:
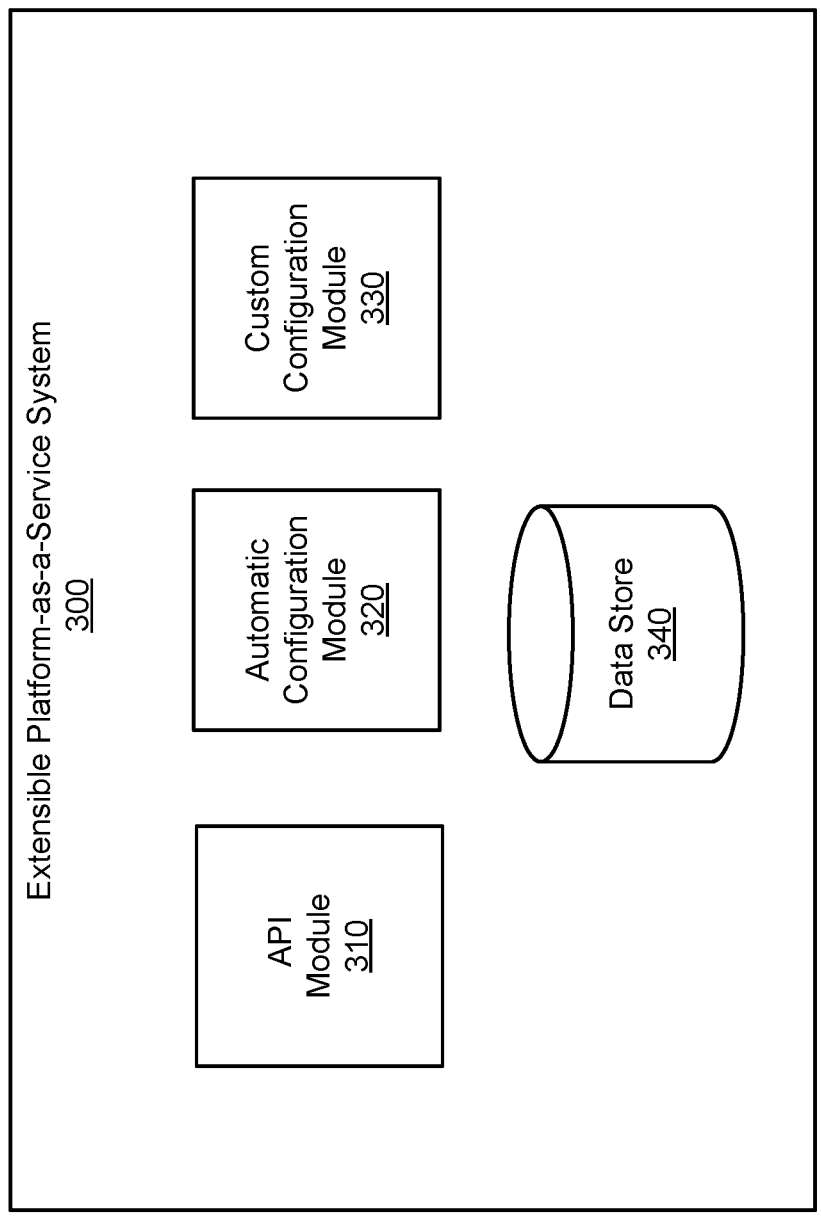
FIG. 3 is a block diagram illustrating modules of an extensible PaaS system, according to one embodiment.

FIG. 3 is a block diagram illustrating modules of the extensible PaaS system 300 according to one embodiment. The extensible PaaS (exPaaS) system 300 includes an API module 310, an automatic configuration module 320, a custom configuration module 330, and a data store 340. Alternative configurations of extensible PaaS system 300 may include different and/or additional modules. Functionality that is indicated as being performed by a particular module may be performed by other modules than those indicated herein. Furthermore, steps of any processes described herein can be performed in an order different from that illustrated herein.

The modules of exPaaS system 300 may execute in a trusted public cloud environment such as a trusted public cloud environment 120 that resides within a public cloud environment such as public cloud environment 100 depicted in FIG. 1. The exPaaS system 300 may be used to perform the operational functionalities described in FIG. 2 as being performed by the exPaaS system 200. Instances of the exPaaS system 300 may reside and execute in instances of the trusted public cloud environment such as TPCEI 125 depicted in FIG. 1. Instances of the exPaaS system 300 may be executed by service owners in various environments such as a testing environment and a production environment, etc.

The API module 310 presents an API to a user (e.g., user 210 in FIG. 2). In some embodiments, the API module 310 enables the user to interact with a limited set of features of a simplified abstraction model for the underlying platform of software modules to be used in the SDLC processes during development of a user application. Some of the features in the simplified abstraction model that are exposed to the user through the API include: application (i.e., source code of the application), artifacts (of the application), environments (in which the application may exist), and the pipeline (defining the flow of the artifacts in the environments). The features in the simplified abstraction model exposed to the user through the API represent a small number of the set of all possible configurable features of the underlying platform software modules that may be used during the SDLC processes of the user application. The API module 310 enables the exPaaS system 300 to receive values for these limited set of features from the presented API to the user. The values received from the user may be in the form of, e.g., source code, data such as name of the application, team name associated with the application developer, environments in which the application may reside (functional domain associated with the application, TCPE instances), code libraries, etc. The API may also display, based on the values received for these features, the set of underlying software modules for use during SDLC processes of the user application. The API may also receive one or more requests, queries, and commands from the user and display the responses to these queries and commands. For example, a request from the user may be to display the set of underlying software modules that may be used by the exPaaS system 300 during the SDLC processes of the user applications. Such a request may specify a phase of the SDLC of the user application that the user may be interested in. For example, the user may request to view the underlying software modules that will be used during the "deployment" phase of the SDLC of the user application. In response, among other relevant software modules, the API module 310 may display the Helm™ chart available for use by the user.

The interactions with the exPaaS system are performed using the exPaaS APIs. Various interfaces may be used to invoke APIs exposed by the exPaaS system, for example, graphical user interface or command line interface. For example, the API module 310 may enable a user to use a command line interface (CLI) to invoke and execute the APIs of the exPaaS system 300. For example, a user may invoke and execute a command "expaasctl" along with associated commands and arguments in order to execute an instance of the exPaaS system 300. Some examples of commands that may be used with the CLI may include those shown in Table 1. These commands may further include options (not shown).

TABLE 1

| ExPaaS System - CLI Commands | |
| --- | --- |
| create | create an expaas-based user application from an application name |
| update | update configuration for an expaas-based user application |
| list | list all current expaas-based applications |
| showconfig | print configuration of a specific expaas application |
| show modules | display module metadata for a specific expaas-based application |
| show environments | display target environments of a specific expaas-based application |
| edit | edit expaas-based application configuration |
| . . . | . . . |

An example of the usage of the CLI to invoke and execute the expaasctl command is the following:

>expaasctl app create pvt-messaging-t "pvt-platform"

The command creates an application named "pvt—messaging" The -t option may be used with the create command to specify that the user belongs to a particular team "pvt-platform."

Other commands may be used to invoke and execute certain aspects of the exPaaS system 300, including commands to display the set of underlying software modules/components forming the extensible PaaS for the user application, display the environments for the user application, show a configuration for a specific user application, etc. The API module 310 may facilitate the user to query and obtain information about various aspects of the exPaaS system 300 and bring transparency to the user regarding the exPaaS system 300. The API module 310 may execute commands from the user to view a set of the underlying software modules, and in response display a list of software modules. The exPaaS system provides visibility into the defaults and the configurations generated by the system for the underlying modules. The ability to view the defaults allows users to inspect the available possible parameters that can be modified to customize the modules. Accordingly, the exPaaS system allows users to inspect the configurations of modules. In some embodiments, the system provides different modes of inspection. For example, certain mode of inspection may show only the key configuration parameters, another mode of inspection may show a larger set of configuration parameters, and a third mode of inspection may show all configuration parameters. Users may select the mode of inspection depending on their level of sophistication and understanding of the system and the extent to which they want to customize the system.

The API module 310 may receive a selection of software modules from the user that may form a selection of software modules that the user would prefer to customize. The API module 310 may receive an indication from the user of a selection of software modules that will be partially configured by the user (i.e., only some features in these modules will be configured by the user). The API module 310 may forward the received indication to the automatic configuration module 320 and the custom configuration module 330.

Subsequently, the API module 310 may receive instructions from the custom configuration module 330 regarding exposing features of the selected software modules for custom configuration by the user. The API module 310 may receive an indication from the user of a selection of software modules that will be replaced by corresponding user-provided software modules, i.e., custom versions of these software modules from the user (e.g., the user's customized Helm™ chart, the user's customized Spinnaker™ pipeline, etc.). The API module 310 may forward the received indication to the automatic configuration module 320 and the custom configuration module 330. Subsequently, the API module 310 may receive instructions from the custom configuration module 330 regarding uploading selected customized software modules from the user.

The automatic configuration module 320 represents a simplified abstraction model for automating SDLC processes during application development for the user. The module 320 automatically configures underlying software modules available for use by the user application during the SDLC processes. The automatic configuration is based on the values received for the exposed features of the simplified abstraction model (i.e., application, artifacts, environment, and pipeline) provided by the user. In addition, the automatic configuration module 320 may obtain templates from a software module library (e.g., SC library 240 in FIG. 2) that may be stored in the data store 340. In some embodiments, for example, the automatic configuration module 320 may provide the user with following configured software modules, such as:

- a configured Git™ repository—to track all changes made to files associated with the user application
- basic program templates in a default language such as Java™
- configured test programs that are security approved
- a configured Helm™ chart for creating containerized applications
- a configured Jenkins™ pipeline for CI
- a configured Spinnaker™ pipeline for CD
- etc.

For example, when the CLI command:

>expaasctl app create pvt-messaging-t "pvt-platform" is executed, the automatic configuration module 320 automatically configures several features for the underlying software modules. An example of configured values for some features are shown below. The user may view configuration specifics by executing the showconfig command (see Table 1 and example below):

Show Configuration Example

>expaasctl app showconfig pvt-messaging
  appType: scone-app
  gusProductTag: Pvt-Messaging
  livenessProbe:
  containerPort: 7080
  path:/actuator/health/liveness
  org: my-service-org-name
  ports:
  name: http
  port: 7442
  type: Internal
  name: http-admin
  port: 7080
  type: Internal
  readinessProbe:
  containerPort: 7080
  path:/actuator/health/readiness
  replicas: 1
  repoName: pvt-messaging
  resourceLimits:
  cpuLimit: "8"
  cpuRequest: "4"
  memoryLimit: 16G
  memoryRequest: 16G
  teamEmail: pvtplatform@mycompany.com
  teamName: PVT Platform Similarly, the user may view environment specifics by executing the showenvironments command (see Table 1 and example below):

>expaasctl app showenvironments pvt-messaging
  environments:
  environmentTargets:
  envtype-region: devl-uswest functionalDomainInstance:
    cooperative-domain serviceInstances:
    cells:
    instanceName: platl type: cooperative-domain-cell
    instanceName: sharl type: cooperative-domain-cell
    instanceName: servl type: cooperative-domain-cell envtype-region: testl-uswest functionalDomainlnstance:
   cooperative-domain servicelnstances:
cells:
   instanceName: pvtll type: cooperative-domain-cell
   instanceName: stmfa type: cooperative-domain-cell
   instanceName: stmfb type: cooperative-domain-cell
   instanceName: stmfc type: cooperative-domain-cell
   instanceName: stmu type: cooperative-domain-cell
   instanceName: stmpa type: cooperative-domain-cell
envtype-region: perfl-useast functionalDomainlnstance:
   cooperative-domain servicelnstances:
cells:
   instanceName: perfl
   type: cooperative-domain-cell One or more of the names, values, fields, and parameters shown in the above examples may be replaced by different names, values, fields, and parameters during the automatic configuration performed by the automatic configuration module 320 in various embodiments of the exPaaS system 300.

The automatic configuration module 320 may receive an indication from the API module 310 that the user has selected a subset of software modules for customized configuration. In one case, the automatic configuration module 330 may receive an indication that a selected subset of underlying software modules will be partially custom configured by the user. In this case, the automatic configuration module 320 may automatically configure only a partial set of features of selected software modules (i.e., the remaining features in these selected modules need to be custom configured by the user). In a second case, the automatic configuration module 320 may receive an indication that a selected subset of underlying software modules will be entirely replaced by the custom version of the selected subset of underlying software modules. In this case, the automatic configuration module 320 may not automatically customize any feature in the selected subset of software modules. The automatic configuration module 320 will ensure that the automatically configured modules are available for use during the SDLC processes of the user application.

The custom configuration module 330 facilitates customization of selected software modules for use during the SDLC processes of a user application by the user. The custom configuration module 330 may receive indications from the API module 310 that the user has selected a subset of underlying PaaS software modules for custom configuration.

In one case, the custom configuration module 330 may receive an indication that a selected subset of underlying software modules will be partially custom configured by the user. In this case, the custom configuration module 330 will instruct the API module 310 to expose features for the selected subset of underlying software modules to the user so that the custom configuration values may be received from the user at the API for any of the exposed features. Subsequently, the custom configuration module 330 will ensure that the selected subset of partially custom configured are fully configured—with the received custom configuration values from the user and with the remaining features automatically configured by the automatic custom configuration module 320.

In a second case, the custom configuration module 330 may receive an indication that a selected subset of underlying software modules will be entirely replaced by the custom version of the selected subset of underlying software modules. The custom configuration module 330 will instruct the API module 310 to enable the user to upload the selected customized software modules. Subsequently, the custom configuration module will integrate the uploaded customized software modules from the user unto the extensible PaaS for use during the SDLC processes of the user application.

In some embodiments, the custom configuration module 330 will enable the user to partially or entirely customize underlying software modules anytime during the SDLC processes of the user application. The custom configuration module 330 will ensure that the custom configured modules are available for use during the SDLC processes of the user application.

The data store 340 stores information for the exPaaS system 300. The stored information may include a library of underlying software modules (e.g., SC library 240 in FIG. 2) that are preconfigured and meet security standards. In some embodiments, the underlying software modules in the library may be tagged with phases of the SDLC processes of a user application where they may be used, and a software module in the library may be tagged with multiple phases, indicating use during the tagged SDLC phases. The stored information may include default parameter values for use by the automatic configuration module 320. The data store 340 may include the Git™ repositories in association with various user applications using the exPaaS system 300. In some embodiments, configurations of underlying software modules that have been customized by the user, such as a custom Helm™ chart, a custom Spinnaker™ pipeline, etc., may be stored in the data store 340 for use during the SDLC processes of the user application. In some embodiments, the underlying software modules may be tagged with, possibly overlapping, phases of the SDLC processes. In some embodiments, the custom configured software modules may be made available for use by other application developers.

The data store 340 is a memory, such as a read only memory (ROM), dynamic random-access memory (DRAM), static random-access memory (SRAM), or some combination thereof. In some embodiments, the various modules of the exPaaS system 300 may pass various data values directly to each other. In some embodiments, the various modules of the exPaaS system 300 may store data values in the data store 340 and retrieve data values as needed from the data store 340.

Process Executed by an Extensible Platform-as-a-Service System

Figure 4:
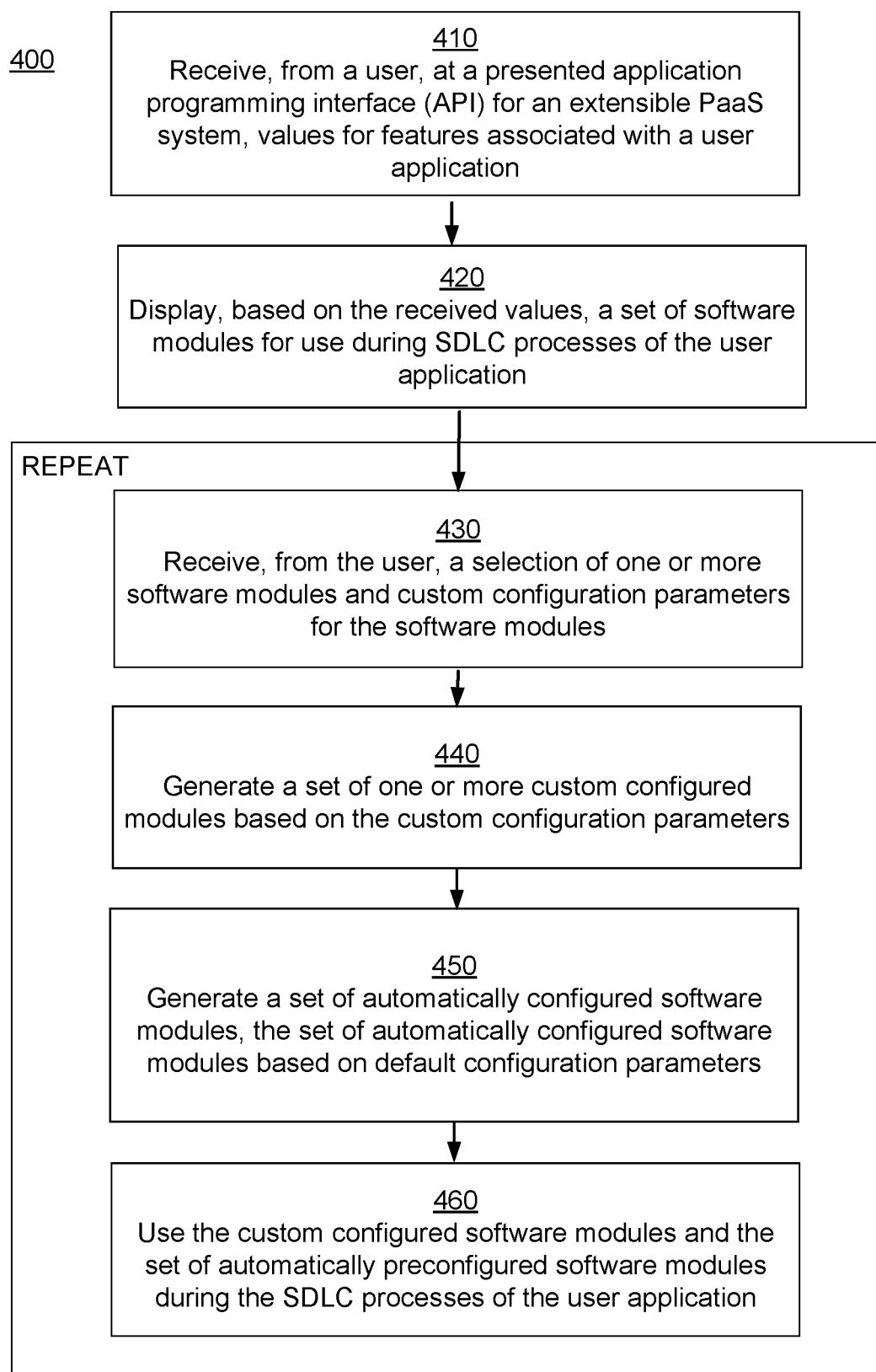
FIG. 4 is a flow chart illustrating the process for enabling a use of the extensible PaaS system, according to one embodiment.

FIG. 4 is a flow chart illustrating the overall process executed by an extensible PaaS system 300 (shown in FIG. 3) according to one embodiment. The process illustrated herein is performed by an instance of the exPaaS system 300. Various embodiments can perform the steps of FIG. 4 in different orders than those indicated herein. Moreover, other embodiments can include different and/or additional steps than the ones described herein.

The exPaaS system 300 receives 410, from the user, values for one or more features exposed in an API that is presented to the user. The user may be an application developer who is developing a user application and who will use the exPaaS system 300 during the SDLC processes of the user application. The exposed features may be a limited set of features of a simplified abstraction model for the underlying platform of software modules to be used in the SDLC processes during development of the user application. In some embodiments, some of the features in the simplified abstraction model that are exposed to the user by the exPaaS system 300 may include: application, artifacts (of the application), environments (in which the application may exist), and the pipeline (defining the flow of the artifacts in the environments).

The exPaaS system 300 displays 420 a set of underlying software modules for use during the SDLC processes of the user application. This display may be based on the values received for the features in the simplified abstraction model. In some embodiments, the exPaaS system 300 may receive a request from the user to display the set of underlying software modules. In some embodiments, the user may additionally specify a phase of the SDLC for which the display is requested, and the displayed set of modules may be the software modules that will be used during the specified phase of the SDLC processes of the user application.

The exPaaS system 300 receives 430, from the user, a selection of one or more software modules for custom configuration from the displayed set of software modules. In some embodiments, each of the received selection of software modules may be accompanied by an indication of whether the user desires partial custom configuration of the selected software module or wishes to entirely replace the software module with a custom configured module.

The exPaaS system 300 generates 440 custom configured software modules for the received selection of one or more software modules. In some embodiments, when the received indication is that a module will be partially configured by the user, the exPaaS system 300 presents an API for the indicated software module, and receives, from the user, values for one or more features that are exposed in the presented API for the indicated software module. The system 300 generates the custom configured software module for the indicated module based on the received values from the user. In some embodiments, when the received indication is that a module will be replaced by a corresponding user-provided module (i.e., entirely configured by the user), the exPaaS system 300 presents an interface for uploading, by the user, the corresponding user-provided software module for the indicated software modules. Subsequently, the system 300 generates the custom module based on the uploaded software module.

The exPaaS system 300 generates 450 a set of automatically configured software modules for those modules in the displayed set of software modules that are not in the set of desired custom modules, i.e., the displayed set of software modules from which the received selection of one or more software modules (from the user) is removed.

The exPaaS system 300 uses the set of custom configured software modules and the set of automatically configured software modules during the SDLC processes of the user application.

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs multiple salespersons, where each salesperson uses a client device to manage their sales process. Thus, a user might maintain contact data, leads data, customer follow-up data, performance data, goals and progress data, etc., all applicable to that user's personal sales process.

Computer Architecture

Figure 5:
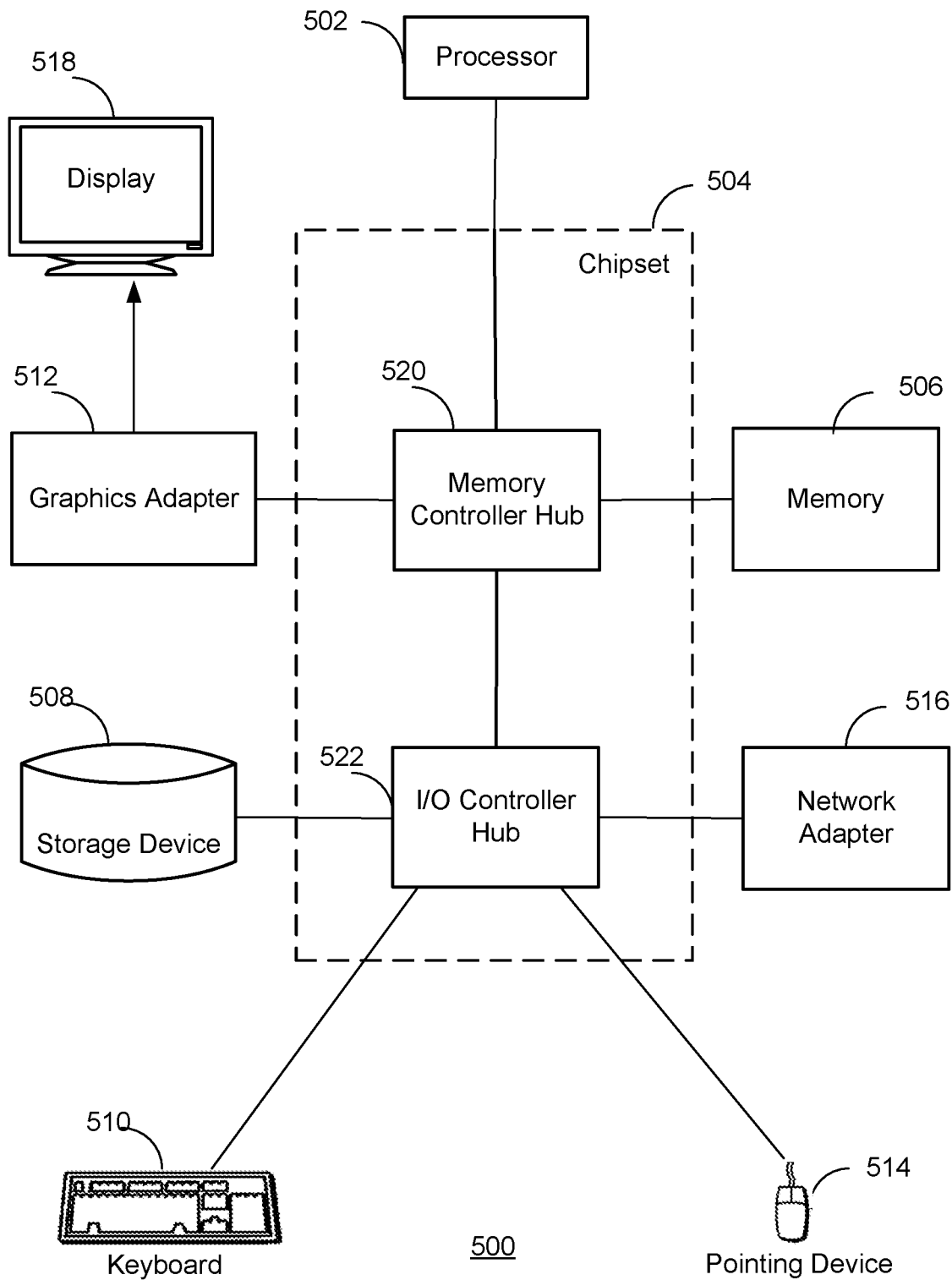
FIG. 5 is a block diagram illustrating the architecture of a typical computer system for use in the environment of FIG. 3, according to one embodiment.

FIG. 5 is a block diagram illustrating the architecture of a typical computer system 500 for use in the environments of FIG. 3 according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to a network.

As is known in the art, a computer system 500 can have different and/or other modules than those shown in FIG. 5. In addition, the computer system 500 can lack certain illustrated modules. For example, a computer system 500 acting as an online system 300 may lack a keyboard 510 and a pointing device 514. Moreover, the storage device 508 can be local and/or remote from the computer 500 (such as embodied within a storage area network (SAN)).

The computer system 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the system of FIG. 3 can vary depending upon the embodiment and the processing power used by the entity. For example, a client device may be a mobile phone with limited processing power, a small display 518, and may lack a pointing device 514. The online system 400 in contrast, may comprise multiple blade servers working together to provide the functionality described herein.

Additional Considerations

The particular naming of the modules, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system modules described herein is merely exemplary, and not mandatory; functions performed by a single system module may instead be performed by multiple modules, and functions performed by multiple modules may instead performed by a single module.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer-implemented method for customizing software modules provided by an extensible platform-as-a-service (PaaS) system for use during a software development life cycle (SDLC) processes of a user application, the method comprising:
   receiving, from a user, at a presented application programming interface (API) for an extensible PaaS system, values for features associated with a user application;
   displaying, based on the received values, a set of software modules for use during SDLC processes of the user application;
   receiving, from the user, a selection of one or more software modules for custom configuration from the displayed set of software modules;
   generating a set of one or more custom configured software modules for the received selection of one or more software modules;
   generating a set of automatically configured software modules, the set of automatically configured software modules based on the displayed set of software modules from which the received selection of one or more software modules is removed; and
   using the set of one or more custom configured software modules and the set of automatically configured software modules during the SDLC processes of the user application.

2. The computer-implemented method of claim 1, wherein receiving, from the user, the selection of one or more software modules for the custom configuration from the displayed set of software modules further comprises one or more of:
   receiving an indication, from the user, that one or more of the software modules from the displayed set of software modules will be partially configured by the user; and
   receiving an indication, from the user, that one or more of the software modules from the displayed set of software modules will be replaced by corresponding user-provided one or more software modules.

3. The computer-implemented method of claim 2, wherein, in response to receiving the indication, from the user, that one or more of the software modules from the displayed set of software modules will be partially configured by the user, generating the set of one or more custom configured software modules for the received selection of one or more software modules comprises:
   presenting one or more APIs for the indicated one or more software modules;
   receiving, from the user, values for one or more features exposed in the presented one or more APIs for the indicated one or more software modules; and
   generating the set of one or more custom configured software modules based on the received values for the one or more features exposed in the presented one or more APIs.

4. The computer-implemented method of claim 2, wherein, in response to receiving the indication from the user that one or more of the software modules from the displayed set of software modules will be replaced by the corresponding user-provided one or more software modules, generating the set of one or more custom configured software modules for the received selection of one or more software modules comprises:

presenting an interface for uploading, by the user, the corresponding user-provided one or more software modules for the indicated one or more software modules; and generating the set of one or more custom configured software modules based on the uploaded user-provided one or more software modules.

5. The computer-implemented method of claim 1, wherein the received values for features associated with the user application comprise:

source code associated with the user application;

one or more artifacts associated with the SDLC processes of the user application;

one or more environments in which the user application should exist; and one or more pipelines/releases associated with the user application.

6. The computer-implemented method of claim 1, wherein the displayed set of software modules for use during the SDLC processes of the user application is in response to a received request from the user at the API.

7. The computer-implemented method of claim 6, wherein the received request from the user at the API specifies a phase of the SDLC processes of the user application.

8. The computer-implemented method of claim 7, wherein the displayed set of software modules comprise the software modules that are used during the specified phase of the SDLC processes of the user application.

9. The computer-implemented method of claim 1, the method further comprising:

storing the generated set of one or more custom configured software modules; and enabling use of the stored one or more custom configured software modules from the user by other users of the extensible PaaS system.

10. A non-transitory computer readable storage medium for storing instructions that when executed by a computer processor cause the computer processor to perform steps for customizing software modules provided by an extensible platform-as-a-service (PaaS) system for use during a software development life cycle (SDLC) processes of a user application, the steps comprising:

receiving, from a user, at a presented application programming interface (API) for an extensible PaaS system, values for features associated with a user application;

displaying, based on the received values, a set of software modules for use during SDLC processes of the user application;

receiving, from the user, a selection of one or more software modules for custom configuration from the displayed set of software modules;

generating a set of one or more custom configured software modules for the received selection of one or more software modules;

generating a set of automatically configured software modules, the set of automatically configured software modules based on the displayed set of software modules from which the received selection of one or more software modules is removed; and using the set of one or more custom configured software modules and the set of automatically configured software modules during the SDLC processes of the user application.

11. The computer readable storage medium of claim 10, wherein receiving, from the user, the selection of one or more software modules for the custom configuration from the displayed set of software modules further comprises one or more of:

receiving an indication, from the user, that one or more of the software modules from the displayed set of software modules will be partially configured by the user; and receiving an indication, from the user, that one or more of the software modules from the displayed set of software modules will be replaced by corresponding user-provided one or more software modules.

12. The computer readable storage medium of claim 11, wherein, in response to receiving the indication, from the user, that one or more of the software modules from the displayed set of software modules will be partially configured by the user, generating the set of one or more custom configured software modules for the received selection of one or more software modules comprises:

presenting one or more APIs for the indicated one or more software modules;

receiving, from the user, values for one or more features exposed in the presented one or more APIs for the indicated one or more software modules; and generating the set of one or more custom configured software modules based on the received values for the one or more features exposed in the presented one or more APIs.

13. The computer readable storage medium of claim 11, wherein, in response to receiving the indication from the user that one or more of the software modules from the displayed set of software modules will be replaced by the corresponding user-provided one or more software modules, generating the set of one or more custom configured software modules for the received selection of one or more software modules comprises:

presenting an interface for uploading, by the user, the corresponding user-provided one or more software modules for the indicated one or more software modules; and generating the set of one or more custom configured software modules based on the uploaded user-provided one or more software modules.

14. The computer readable storage medium of claim 10, wherein the received values for features associated with the user application comprise:

source code associated with the user application;

one or more artifacts associated with the SDLC processes of the user application;

one or more environments in which the user application should exist; and one or more pipelines/releases associated with the user application.

15. The computer readable storage medium of claim 10, wherein the displayed set of software modules for use during the SDLC processes of the user application is in response to a received request from the user at the API.

16. The computer readable storage medium of claim 15, wherein the received request from the user at the API specifies a phase of the SDLC processes of the user application.

17. The computer readable storage medium of claim 16, wherein the displayed set of software modules comprise the software modules that are used during the specified phase of the SDLC processes of the user application.

18. The computer readable storage medium of claim 10, the steps further comprising:
   storing the generated set of one or more custom configured software modules; and
   enabling use of the stored one or more custom configured software modules from the user by other users of the extensible PaaS system.

19. A computer system comprising:
   a computer processor; and
   a non-transitory computer readable storage medium for storing instructions that when executed by a computer processor cause the computer processor to perform steps for customizing software modules provided by an extensible platform-as-a-service (PaaS) system for use during a software development life cycle (SDLC) processes of a user application, the steps comprising:
      receiving, from a user, at a presented application programming interface (API) for an extensible PaaS system, values for features associated with a user application;
      displaying, based on the received values, a set of software modules for use during SDLC processes of the user application;
      receiving, from the user, a selection of one or more software modules for custom configuration from the displayed set of software modules;
      generating a set of one or more custom configured software modules for the received selection of one or more software modules;
      generating a set of automatically configured software modules, the set of automatically configured software modules based on the displayed set of software modules from which the received selection of one or more software modules is removed; and
      using the set of one or more custom configured software modules and the set of automatically configured software modules during the SDLC processes of the user application.

20. The system of claim 19, wherein receiving, from the user, the selection of one or more software modules for the custom configuration from the displayed set of software modules further comprises one or more of:
   receiving an indication, from the user, that one or more of the software modules from the displayed set of software modules will be partially configured by the user; and
receiving an indication, from the user, that one or more of the software modules from the displayed set of software modules will be replaced by corresponding user-provided one or more software modules.

* * * * *